(12) United States Patent
Moore et al.

(10) Patent No.: US 8,654,410 B1
(45) Date of Patent: Feb. 18, 2014

(54) DOCUMENT READER INCLUDING AN OPTICAL MOVEMENT DETECTION SYSTEM

(75) Inventors: Michael J. Moore, Beverly Hills, MI (US); John C. Gudenburr, Canton, MI (US); Sammy C. Hutson, Novi, MI (US)

(73) Assignee: Burroughs, Inc., Plymouth, MI (US)

( * ) Notice: Subject to any disclaimer, the term of this patent is extended or adjusted under 35 U.S.C. 154(b) by 1339 days.

(21) Appl. No.: 11/903,944

(22) Filed: Sep. 25, 2007

(51) Int. Cl.
*H04N 1/04* (2006.01)

(52) U.S. Cl.
USPC ........... 358/474; 358/408; 358/482; 358/483; 358/497; 358/505

(58) Field of Classification Search
USPC ................................. 358/301, 505, 474–498
See application file for complete search history.

(56) References Cited

U.S. PATENT DOCUMENTS

| | | |
|---|---|---|
| 4,684,998 A * 8/1987 | Tanioka et al. | 358/473 |
| 2002/0105689 A1 * 8/2002 | Otoko et al. | 358/505 |
| 2004/0070798 A1 * 4/2004 | Andersen et al. | 358/498 |
| 2004/0169846 A1 * 9/2004 | Ross | 356/71 |
| 2005/0057510 A1 * 3/2005 | Baines et al. | 345/166 |
| 2005/0186710 A1 * 8/2005 | Moyer et al. | 438/116 |
| 2005/0252975 A1 * 11/2005 | Furihata et al. | 235/475 |
| 2006/0029296 A1 * 2/2006 | King et al. | 382/313 |
| 2006/0256391 A1 * 11/2006 | Eom et al. | 358/305 |

* cited by examiner

*Primary Examiner* — Qian Yang
*Assistant Examiner* — Marcellus Augustin
(74) *Attorney, Agent, or Firm* — Honigman Miller Schwartz and Cohn LLP

(57) ABSTRACT

A document scanner is disclosed. The document scanner includes a document bed having a document positioning surface. The document scanner further includes a scanner module slidably attached to the document bed. The scanner module includes an optical movement sensor configured to detect movement of the scanner module relative to the document positioning surface. A method of operation of the scanner module is disclosed as well.

22 Claims, 4 Drawing Sheets

DOCUMENT READER INCLUDING AN OPTICAL MOVEMENT DETECTION SYSTEM

TECHNICAL FIELD

The present disclosure relates generally to a document reader, such as a check scanner. In particular, the present disclosure relates to a document reader including an optical movement detection system.

BACKGROUND

A transfer of funds can lag a business transaction, such as a purchase, by many days if a check or other negotiable instrument is used. This is because routing information must be read and processed, and the document must be transferred to a bank for funds to be exchanged. This time lag, or "float", represents a substantial amount of time after transactions occur in which funds may accrue interest. It is therefore advantageous to companies or institutions accepting checks as a form of payment to process those checks as soon as possible after a transaction occurs to accrue this interest.

It can be advantageous to electronically read routing information on checks and also to scan checks or other documents representing a purchase in such a scenario. Modern scanning equipment, such as flatbed scanners, include a moveable scanning mechanism which passes along the length of the document. The scanning mechanism is guided at a constant speed along the length of the document by a linear rod. The document to be scanned is isolated from the scanning mechanism by a transparent panel. This is because if the document moves during the scanning process, the resulting scanned image can be skewed such that it becomes unreadable.

In check reading systems and other negotiable instrument scanners, various components, such as radial encoder or a magnetic character reader, contacts the document directly. In such systems, the friction occurring between the radial encoder and the document causes the document to move, and therefore causes skew when the document is scanned. Furthermore, radial encoders can constitute a large portion of the cost of an otherwise low-cost document reading system.

For these and other reasons, improvements are desirable.

SUMMARY

In accordance with the following disclosure, the above and other problems are solved by the following:

In a first aspect, a document scanner is disclosed. The document scanner includes a document bed having a document positioning surface. The document scanner further includes a scanner module slidably attached to the document bed. The scanner module includes an optical movement sensor configured to detect movement of the scanner module relative to the document positioning surface.

In a second aspect, a method of operating a document scanner is disclosed. The method includes detecting movement of a scanner module relative to a document positioning surface of a document bed using an optical movement sensor. The method further includes providing movement information to at least one acquisition device in the scanner module.

In a third aspect, a check scanner is disclosed. The check scanner includes a document bed having a check positioning surface. The check scanner also includes a scanner module slidably attached to the document bed, a contact image sensor incorporated into the scanner module, and a magnetic character reader incorporated into the scanner module. The check scanner further includes an optical movement sensor incorporated into the scanner module and configured to detect movement of the scanner module relative to the check positioning surface.

DETAILED DESCRIPTION

Figure 1:
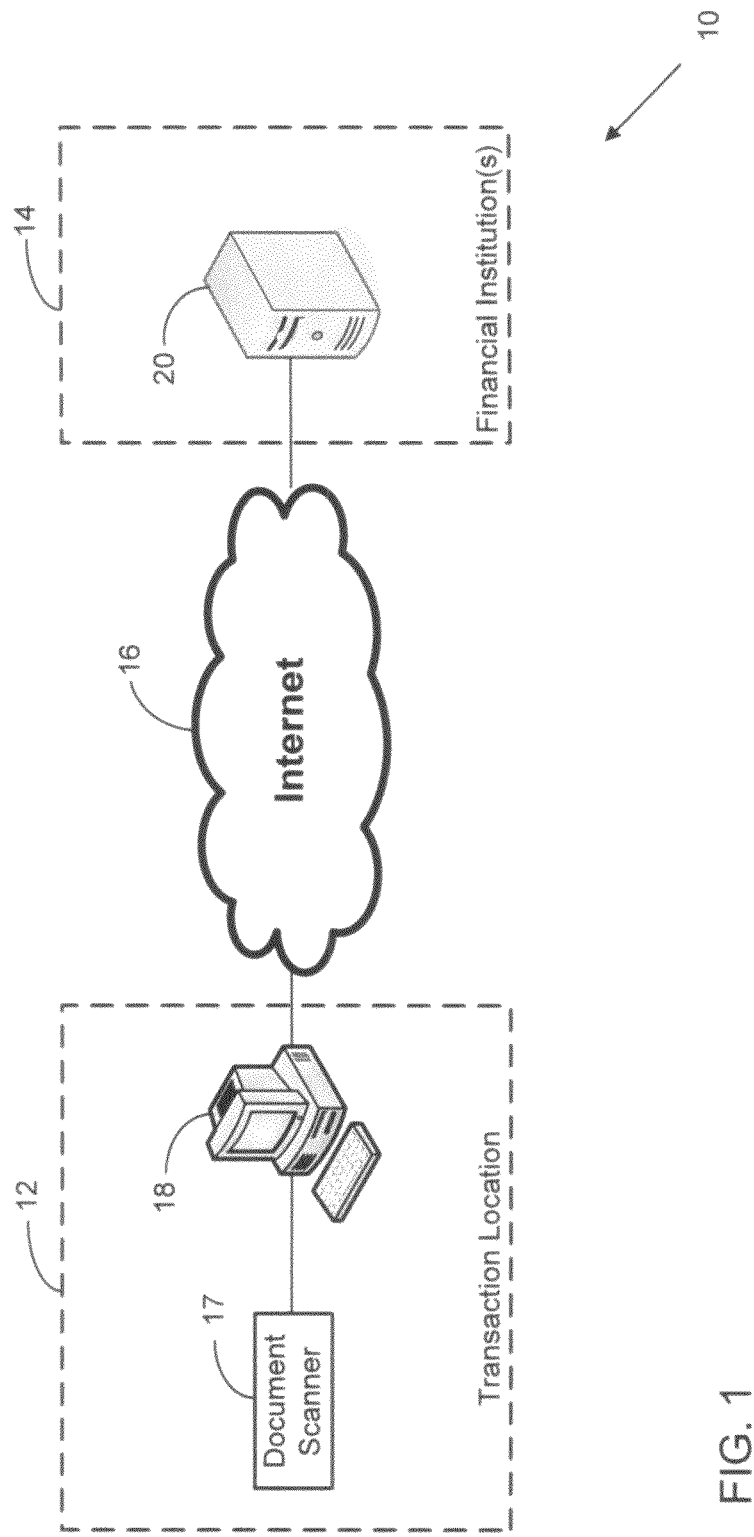
FIG. 1 is a schematic depiction of a network in which an electronic financial transaction may be placed, in accordance with the present disclosure.

Various embodiments of the present disclosure will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In general, the present disclosure relates to a document reader, such as a check scanner. Specifically, the present disclosure relates to a document reader including an optical movement detection system. The document reader, or document scanner, refers to a scanning device configured to use an electronic data acquisition system to obtain information about a printed document. The optical movement detection system is incorporated into the electronic data acquisition system, and provides positional or movement feedback to other components of the system for generation of electronic text or images. The document reader may, in various embodiments, capture image or character information from a document, or both. The document reader can also operate in a networked environment to communicate the captured information to remote locations, reducing a lag time in communication of information printed on the document.

One specific example of a system in which a document reader or scanner may be used is shown in FIG. 1. FIG. 1 illustrates a schematic view of a network 10 in which a financial transaction may take place, according to a possible embodiment of the present disclosure. The network 10 generally includes one or more transaction locations 12 and financial institutions 14, communicatively connected by a network, shown as the internet 16. A transaction location 12 may be any of a number of places of business at which a financial transaction may take place, such as for purchase or sale of goods and services. Example transaction locations may include restaurants, supermarkets, or other places of business. Each transaction location includes a document scanner 17 interconnected with a computing system 18. The document scanner 17 is arranged to provide the transaction location with the ability to electronically acquire information about a printed document, such as a check used for payment in exchange for goods and/or services. In certain embodiments, the document scanner 17 can be a check scanner, which is sized and designed to be a low cost solution to read account information on personal checks and scan images of one or both sides of the check. An example document scanner useable in the network 10 is described below in conjunction with FIGS. 2-4.

The computing system 18 can be any of a number of types of computing systems, such as a general purpose personal computer, or a specialized computer such as a cash register or inventory system. The computing system 18 can interconnect with the document scanner 17 by any of a number of standard or specialized communication interfaces, such as a USB, 802.11a/b/g network, RF, infrared, serial, or other data connection. In certain embodiments, the computing system 18 runs an application configured to control the document scanner 17; in further embodiments, the computing system receives data from the document scanner and stores and/or communicates the data (images, text, or other information) to other systems to which it is interconnected.

Each of the financial institutions 14 generally includes a computing system 20, which is configured to receive electronic records of financial transactions relevant to the financial institutions. The computing system 20 can be any of a number of types of computing systems capable of storing and managing financial transactions; in the embodiment shown, the computing system is a server system comprising one or more discrete computing units interconnected, as is known in the art.

The electronic records can be electronic transaction records, and can include scanned copies of documents memorializing financial transactions. In a particular example, an electronic record can reflect a purchase made with a check, in which the electronic record includes the relevant information on the face of the check, the routing and institution number printed on the check, and an image of one or more sides of the check, used to validate the other information and to display relevant endorsements of the check. Other electronically captured transactions, such as credit card transactions, contracts, or other negotiable instrument transactions may be tracked using the network 10 as well.

The internet connection 16 depicted can be any of a number of WAN, LAN, or other packet based communication networks such that data can be shared among a number of computing systems or other networked devices. Furthermore, although in the embodiment shown two computing devices 18, 20 at different, specific locations are depicted, the computing devices and/or the document scanner 17 may be located at the same location or within the same network.

Figure 2:
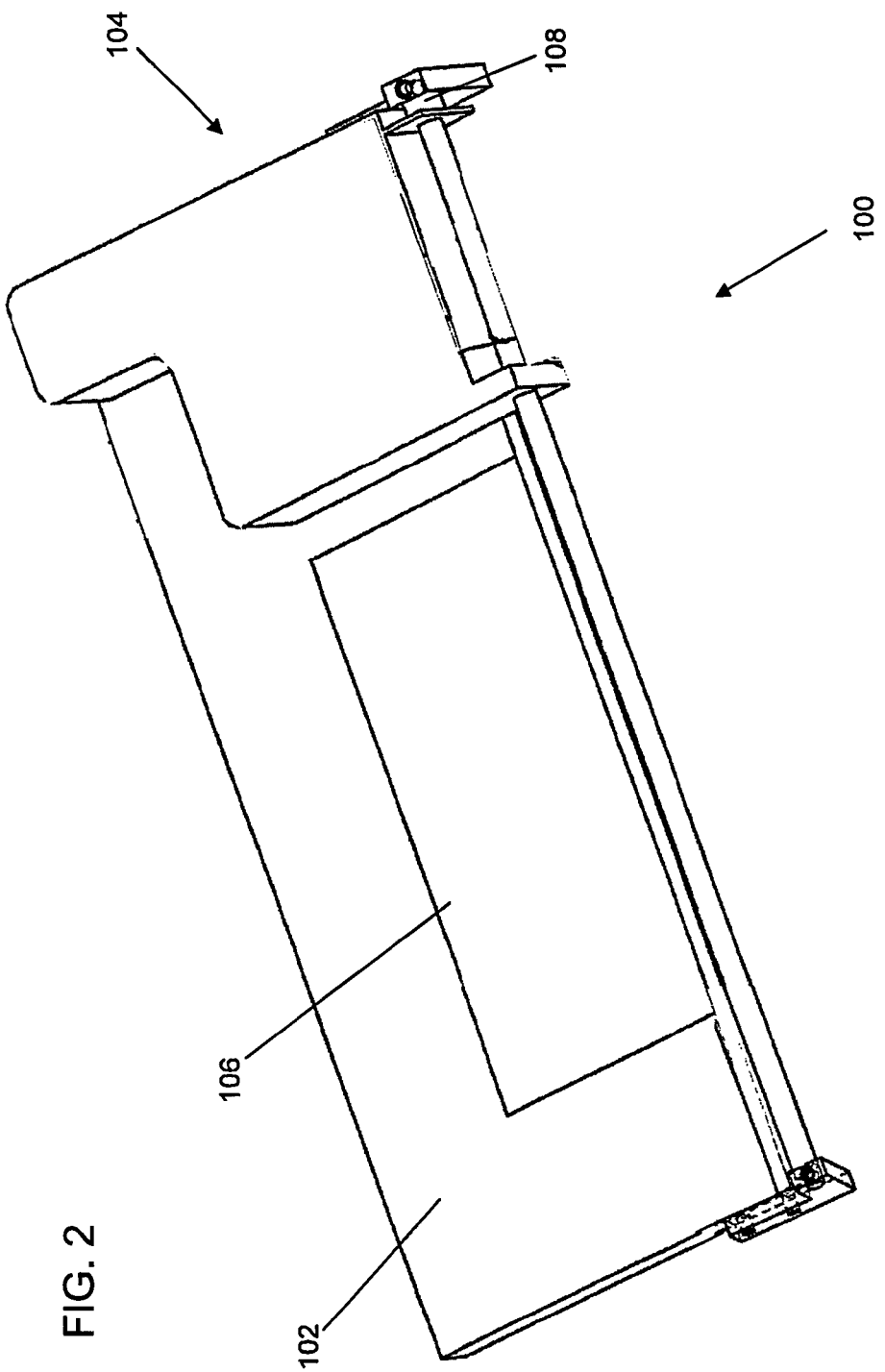
FIG. 2 is a front perspective view of a document reader having an optical movement sensor, according to a possible embodiment of the present disclosure.

FIG. 2 is a front perspective view of a document reader 100 having an optical movement sensor, according to a possible embodiment of the present disclosure. In certain embodiments, the document reader 100 can correspond to the document scanner 17 of FIG. 1. The document reader 100 is generally configured to be a low-cost, manual use electronic information capture device capable of scanning/reading images and characters printed on a document.

The document reader generally includes a document bed 102 and a scanner module 104. The document bed 102 includes a document positioning surface 106, which is configured to receive a document for scanning. In the embodiment shown, the document bed 102 and document positioning surface 106 are sized to receive a personal or business check for scanning; however, in various other embodiments, additional sizes/configurations of documents may be used as well.

The scanner module 104 is slidably attached to the document bed 102 along a slider bar 108. The slider bar 108 is mounted along a side of the document bed, such that the scanner module 104 can be manually passed along the entire length of the document positioning surface 106. In the embodiment shown, the scanner module 104 also rotationally attaches to the slider bar 108 to allow the scanner module to be lifted away from the document positioning surface. The scanner module 104 is generally of approximately the same width as the document bed 102 and/or document positioning surface 106, and can include one or more scanning elements configured to capture information about the document (e.g. a check) placed on the document positioning surface as the module is manually passed over the surface of the document. In the embodiment shown, the slider bar 108 resides along a single side of the document bed 102; however in further embodiments, additional slider bars or retention mechanisms may be used to retain and/or guide the scanner module along the length of the document bed.

Figure 3:
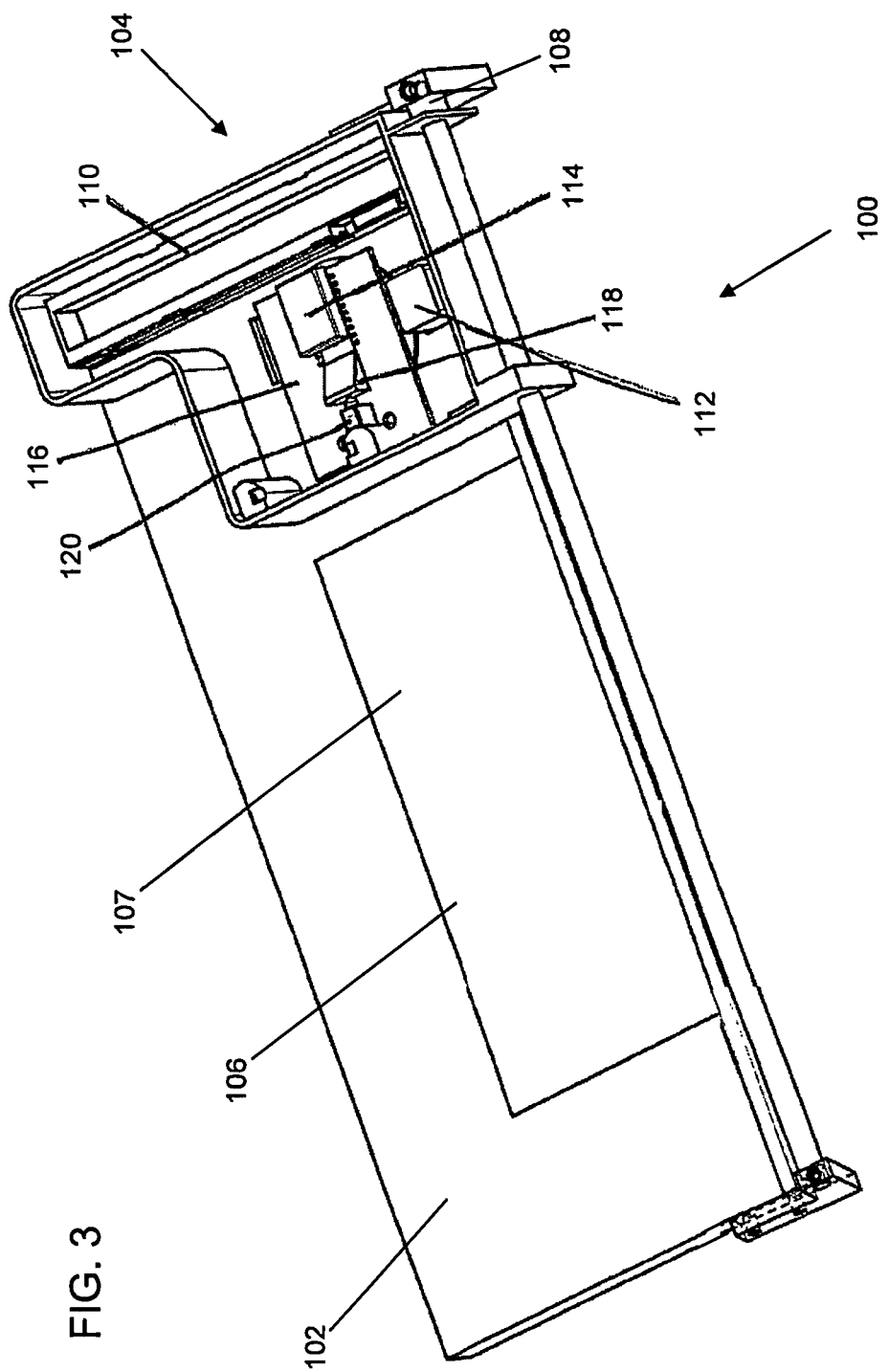
FIG. 3 is a front perspective view of the document reader of claim 2, with a cover removed from the sensor module.

Referring now to FIG. 3, a front perspective view of the document reader 100 is shown with a cover removed from the sensor module 104. The sensor module 104 includes a contact image sensor 110 and a magnetic character reader 112. The contact image sensor 110, includes a linear scan element which can be used to scan an image of a document placed under it. The sensor 110 is passed across a document, such as a check, on the surface 106. In the embodiment shown, the contact image sensor 114 is arranged to pass 0.010 inch from the surface 106, allowing a document to pass closely thereunder. The data gathered by the contact image sensor 110 can be combined with position or speed information to transform data collected by the contact image sensor into an image.

The magnetic character reader 112, when the sensor module 104 is passed across the document, scans magnetic characters located beneath the reader. For example, the magnetic character reader 112 can sense magnetic printing representing routing and account information that are printed on checks, deposit slips, or other similar documents. The data gathered by the magnetic character reader 112 can be combined with position or speed information to transform the data collected into text or images of alphanumeric characters or symbols.

An optical movement sensor 114 is mounted to a printed circuit board 116 within the sensor module 104. The optical movement sensor 114 detects movement of the sensor module 104 with respect to the document positioning surface 106. The optical movement sensor 114 provides the captured movement information to both the contact image sensor 110 and magnetic character reader 112. The sensor components 110-112 receive movement information fed back to them to properly generate electronic images or characters, in that improper position, speed, or other movement information will result in skewed images or characters being generated in the electronic image. In one embodiment, the optical movement sensor 114 is an optical mouse sensor configured to be included in and detect movement of a mouse.

In conjunction with the optical movement sensor 114, an optical light pipe 118 and a light emitting diode 120 are mounted to the printed circuit board 116 as well. The light emitting diode 120 generates light of a specific frequency detectable by the optical movement sensor, and the light pipe 118 directs the light toward the optical movement sensor 114 for detection. Additional components may be added to the printed circuit board 116 for additional functionality as well.

In one embodiment of the sensor module 104, the optical movement sensor 114 detects positional changes occurring at a given sampling rate. The change in position of the optical movement sensor 114 and therefore the sensor module 104 is provided as an input to the contact image sensor 110 and the magnetic character reader 112. These components also scan portions of the document at a given sampling rate, and determine a physical distance between the samples based on the calculated speed of the sensor module 104 at that time, as computed based on data collected by the optical movement sensor 114. Feedback of position and/or speed information to generate images and text from captured data can be performed by any of a variety of algorithms known in the art.

Through use of the optical movement sensor 114 and other related components, the various movement detection devices do not need to make contact with the document to verify the position/movement of the sensor module 104 with respect to the document or document positioning surface 106. This can reduce the amount of friction placed on the document by the sensor module, reducing the probability that movement of the sensor module 104 will cause movement of the document, thereby skewing the image or character read by the components of the sensor module 104. Furthermore, although in the embodiment shown an optical movement sensor 114 is shown, any of a number of optical movement detection systems may be incorporated into the sensor module 104.

Although a specific location of the components in the scanner module 104 is shown, other applications and locations for the contact image sensor 110, magnetic character reader 112, and optical movement sensor 114 are possible as well. Furthermore, additional circuitry may be incorporated into the sensor module 104 as well, such as a memory arranged to store the data acquired by the sensor 110 and reader 112.

Figure 4:
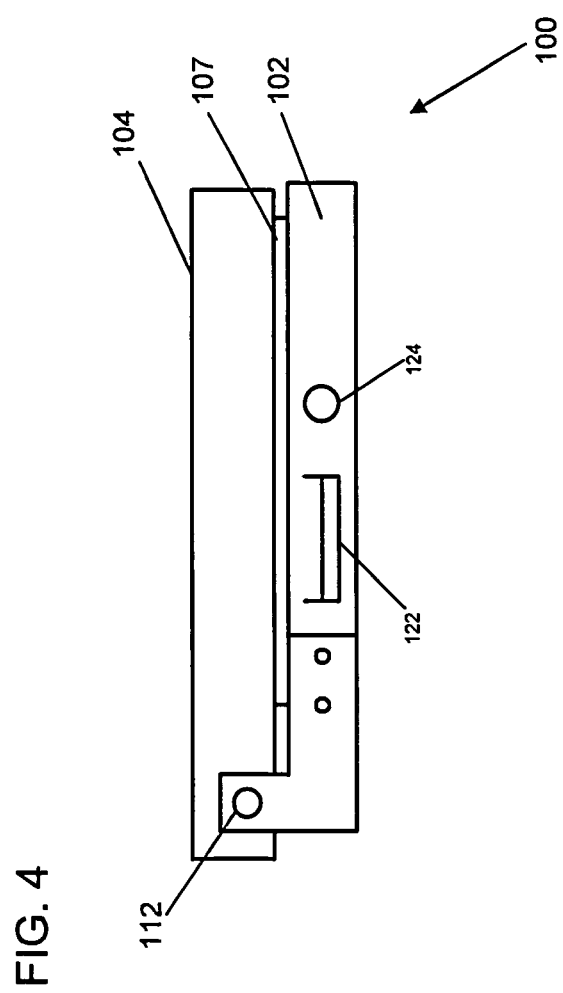
FIG. 4 is a side plan view of the document reader of FIG. 2.

FIG. 4 is a side plan view of the document reader 100, and shows the vertical layout of the various components of the document reader. In the system as shown, a document 107 resides on the document bed 102. The scanner module 104, mounted to the document bed 102 by the slider bar 108, rests on the document 107 such that it extends across the width of the document. The side of the scanner module 104 is preferably a low-friction surface including the various required scanning/reading components, as previously described; The document positioning surface 106 (seen in FIGS. 2-3, above) is preferably a high-friction surface able to maintain the position of the document 107 as the scanner module 104 passes across it to scan the images/text on the document.

The document reader 100 includes a communication connection 122 and a power connection 124. The communication connection 122 provides an interconnection location for connecting the document reader to an external computing system, such as the computing system 18 of FIG. 1. In the embodiment shown, the communication connection 122 is a USB connection; however, other types of communication interfaces may be used, such as a serial connection, RJ-45 or other packet-based wired connection system, Bluetooth, IR, RF, or other connection systems. The power connection 124 receives a power connector, such as an AC or DC power connection configured to provide electrical power to the various scanning components of the document reader 100. Although the document reader 100 is shown as having both a communication connection 122 and power connection 124, in certain embodiments, power to the reader 100 can be supplied by the communication connection, such as in the case of a USB or Firewire connection. Other types of connections may allow for power delivery over a communications interface as well. Furthermore, in the embodiment shown, the communication connection 122 and power connection 124 are located on a side of the document bed 102; in other embodiments, the connections can be located on a different side of the bed or on a side of the scanner module 104.

Referring to the document positioning and retention system for a document reader generally, methods of operation of the reader 100 are discussed. A user, such as a cashier at a business, places a document onto the surface 106 of the document bed 102. The user slides the scanner module 104 across the document. The movement sensor 114 detects movement of the scanner module across the document, while the contact image sensor 110 and the magnetic character reader 112 capture raw image and text information about the document. The movement information detected using the movement sensor is fed back to the contact image sensor and magnetic character reader to generate images and text that are user-recognizable. These images and text can then be stored in memory of the reader 100 (such as in a memory integrated onto the printed circuit board 116), or communicated to a computing system such as the computing system 18 of FIG. 1. The stored image and/or textual information can then be communicated to a financial institution for processing, reducing the time required for notifying a financial institution of the document information by bypassing the requirement of physical transport of the document.

Although the document reader 100 is shown as a manually operated scanning device, additional embodiments consistent with the present disclosure may incorporate an optical movement detection system in a variety of other scanners or image recognition devices. Flatbed scanners or other systems may incorporate an optical movement feedback mechanism in accordance with the present disclosure for generating images or text, in conjunction with the image detection sensors incorporated in such devices.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. An apparatus, comprising:
   a document scanner including a document bed having a document positioning surface;
   a scanner module slidably attached to a member connected to the document bed, wherein the scanner module includes an optical movement sensor, wherein the optical movement sensor provides means for detecting movement of the scanner module relative to the document positioning surface; and
   a contact image sensor incorporated in the scanner module, wherein the contact image sensor provides means for scanning an image of a document, wherein, responsive to detected movement of the scanner, the optical movement sensor activates the contact image sensor, wherein the optical movement sensor further provides means for providing the detected movement information to both of the contact image sensor incorporated in the scanner module, and a magnetic character reader incorporated in the scanner module, wherein, upon receipt of the movement information by both of the contact image sensor and the magnetic character reader, both of the contact image sensor and the magnetic character reader utilize the movement information as movement feedback in order to permit the scanner module to generate electronic images or characters of a document positioned upon the document positioning surface that are user-recognizable and void of skew or distortion during movement of the scanner module across the document bed.

2. The apparatus of claim 1, wherein the magnetic character reader provides
   means for sensing magnetic printing that is printed upon the document for subsequent transformation of the sensed magnetic printing into text or images of alphanumeric characters or symbols.

3. The apparatus of claim 2, responsive to detected movement of the scanner, the optical movement sensor activates the magnetic character reader.

4. The apparatus of claim 1, wherein the member includes
   a slider bar for slidably-connecting the scanner module to the document bed.

5. The apparatus according to claim 4, wherein the slider bar is connected along a side of the document bed such that the scanner module is slidably-arranged along a length of the document positioning surface of the document bed.

6. The apparatus of claim 1, wherein the optical movement sensor is
   an optical mouse sensor.

7. The apparatus of claim 1, wherein the optical movement sensor is mounted on
   a printed circuit board within the scanner module.

8. An apparatus, comprising:
   a document scanner including a document bed having a document positioning surface;
   a scanner module slidably attached to a member connected to the document bed, wherein the scanner module includes an optical movement sensor; and
   a light emitting diode that directs light toward the document positioning surface, wherein the optical movement sensor provides means for detecting at least a portion of the light from the light emitting diode, wherein, upon receipt of movement information by both of a contact image sensor and a magnetic character reader, both of the contact image sensor and the magnetic character reader utilize the movement information as movement feedback in order to permit the scanner module to generate electronic images or characters of a check positioned upon the document positioning surface that are user-recognizable and void of skew or distortion during movement of the scanner module across the document bed.

9. A method, comprising the steps of:
   providing a document scanner including a document bed having a document positioning surface, and a scanner module arranged above the document positioning surface and slidably attached to a member connected to the document bed, wherein the scanner module includes an optical movement sensor, and at least one acquisition device;
   moving the scanner module relative to the document bed, and, while the moving step is conducted, utilizing the optical movement sensor for
      detecting movement of the scanner module relative to the document positioning surface of the document bed;
      providing movement information to the least one acquisition device; and
   rotatably-coupling the scanner module to the member for
      permitting the scanner module to be rotationally lifted away from the document positioning surface, wherein the optical movement sensor conducts the steps of:
         providing detected movement information to both of a contact image sensor incorporated in the scanner module, and a magnetic character reader incorporated in the scanner module, wherein, upon receipt of the movement information by both of the contact image sensor and the magnetic character reader, both of the contact image sensor and the magnetic character reader utilize the movement information as movement feedback in order to permit the scanner module to generate electronic images or characters of a document positioned upon the document positioning surface that are user-recognizable and void of skew or distortion during movement of the scanner module across the document bed.

10. The method of claim 9, further comprising the steps of
   prior to the moving step, positioning a document upon the document positioning surface; and
   utilizing the at least one acquisition device for
      acquiring data about the document.

11. The method of claim 10, wherein the at least one acquisition device includes magnetic character reader, wherein the acquiring data step includes the step of
   utilizing a magnetic character reader for
      reading at least one magnetic character printed upon the document.

12. The method of claim 10, wherein the at least one acquisition device includes contact image sensor, wherein the acquiring data step includes the step of
   utilizing a contact image sensor for
      scanning an image of the document.

13. The method of claim 10, further comprising the step of communicating the data to a remote computing system.

14. The method of claim 9, further comprising the steps of
   prior to the moving step, positioning a check upon the document positioning surface; and
   during the moving step, utilizing the scanner module for
      scanning the check placed on the document positioning surface.

15. An apparatus, comprising:
   a document bed having a check positioning surface;
   a scanner module slidably attached to a member connected to the document bed;
   a contact image sensor incorporated into the scanner module;
   a magnetic character reader incorporated into the scanner module; and
   an optical movement sensor incorporated into the scanner module, wherein the optical movement sensor provides means for detecting movement of the scanner module relative to the check positioning surface, wherein, responsive to the detected movement of the scanner, the optical movement sensor sends movement information to both of: the contact image sensor for activating the contact image sensor, and the magnetic character reader for activating the magnetic character reader, wherein the optical movement sensor further provides means for providing the detected movement information to both of the contact image sensor incorporated in the scanner module, and a magnetic character reader incorporated in the scanner module, wherein, upon receipt of the movement information by both of the contact image sensor and the magnetic character reader, both of the contact image sensor and the magnetic character reader utilize the movement information as movement feedback in order to permit the scanner module to generate electronic images or characters of a document positioned upon the document positioning surface that are user-recognizable and void of skew or distortion during movement of the scanner module across the document bed.

16. The apparatus of claim 15, wherein the member includes
   a slider bar for slidably-connecting the scanner module to the document bed.

17. The apparatus of claim 15, wherein the optical movement sensor is
   an optical mouse sensor.

18. The apparatus of claim 15, further comprising wherein the document bed includes
   a communication connection that provides
      means for connecting the document bed to a computing system.

19. The apparatus according to claim 15, where the contact image sensor provides
   means for scanning an image of a check.

20. The apparatus according to claim 15, wherein the magnetic character reader provides
   means for sensing magnetic printing that is printed upon a check for subsequent transformation of the sensed magnetic printing into text or images of alphanumeric characters or symbols.

21. An apparatus, comprising:
   a document bed having a check positioning surface;
   a scanner module slidably attached to a member connected to the document bed;
   a contact image sensor incorporated into the scanner module;
   a magnetic character reader incorporated into the scanner module;
   an optical movement sensor incorporated into the scanner module; and
   a light emitting diode that directs light toward the check positioning surface, wherein the optical movement sensor provides means for detecting at least a portion of the light from the light emitting diode, wherein, upon receipt of movement information by both of the contact image sensor and the magnetic character reader, both of the contact image sensor and the magnetic character reader utilize the movement information as movement feedback in order to permit the scanner module to generate electronic images or characters of a check positioned upon the check positioning surface that are user-recognizable and void of skew or distortion during movement of the scanner module across the document bed.

22. An apparatus, comprising:
   a document scanner including a document bed having a document positioning surface; and
   a scanner module slidably attached to a member connected to the document bed, wherein the scanner module includes an optical movement sensor, wherein the member includes a slider bar for slidably-connecting the scanner module to the document bed, wherein the scanner module is rotationally-coupled to the slider bar to provide means for permitting the scanner module to be rotationally lifted away from the document positioning surface, wherein, upon receipt of movement information by both of a contact image sensor and a magnetic character reader, both of the contact image sensor and the magnetic character reader utilize the movement information as movement feedback in order to permit the scanner module to generate electronic images or characters of a check positioned upon the document positioning surface that are user-recognizable and void of skew or distortion during movement of the scanner module across the document bed.

* * * * *